United States Patent [19]

Koeda et al.

[11] Patent Number: 4,562,050
[45] Date of Patent: Dec. 31, 1985

[54] PROCESS FOR PRODUCING BORON NITRIDE

[75] Inventors: Kikuo Koeda; Chikara Ito, both of Ibaraki, Japan

[73] Assignee: Yukamelamin Company, Limited, Ibaraki, Japan

[21] Appl. No.: 640,121

[22] Filed: Aug. 13, 1984

[30] Foreign Application Priority Data

Aug. 25, 1983 [JP] Japan ................... 58-154126

[51] Int. Cl.$^4$ .................................................. C01B 21/06
[52] U.S. Cl. ........................................ 423/290; 501/96
[58] Field of Search ........................... 423/290; 501/96

[56] References Cited

U.S. PATENT DOCUMENTS 2,824,787  2/1958  May et al. ........................... 423/290
2,922,699  1/1960  Lauzau ................................. 423/290

FOREIGN PATENT DOCUMENTS 675630  12/1963  Canada ................................. 423/290
45-36213  11/1970  Japan .................................. 423/290

OTHER PUBLICATIONS

Kirk–Othmer, Encyclopedia of Chemical Technology, 3rd Ed., vol. 4, 1978, pp. 128, 129; vol. 20, 1982, pp. 67, 77.

Journal of Polymer Science, Part C, No. 19, pp. 283–291 (1967).

*Primary Examiner*—John Doll
*Assistant Examiner*—Jackson Leeds
*Attorney, Agent, or Firm*—Oblon, Fisher, Spivak, McClelland & Maier

[57] ABSTRACT

A process for producing boron nitride is described, comprising reacting at least one boron compound selected from the group consisting of boric acid and metal salt thereof and at least one nitrogen-containing compound which is capable of bonding to the boron compound to form a compound in which a boron atom and a nitrogen atom co-exist, and then heating the compound thus formed at a temperature of at least 600° C. in an atmosphere of inert or reducing gas. This process can produce high purity boron nitride at relatively low temperatures in high yields. Moreover, boron nitride can be obtained in desired crystal forms including a flake-like crystal form.

7 Claims, 7 Drawing Figures

PROCESS FOR PRODUCING BORON NITRIDE

FIELD OF THE INVENTION

The present invention relates to a process for producing boron nitride and boron nitride obtained thereby.

BACKGROUND OF THE INVENTION

Boron nitride is chemically and thermally stable and further has excellent electrical insulating properties. Therefore, boron nitride is used as a lubricant and a releasing agent which are used at a high temperature and is also used as a heat resistant and corrosion resistant material or a member in the field of electricity as one of so-called new ceramics.

Heretofore, boron nitride has been industrially produced by: (1) a method comprising reduction nitriding boric acid, borates, boron oxides or the like with ammonia gas (optionally in the presence of ammonium chloride); and (2) a method comprising mixing boric acid, borates, boron oxides or the like with nitrogen-containing compounds and then reduction nitriding the mixture in nitrogen or ammonia gas.

Other than the above methods, a method comprising heating elemental boron in nitrogen or ammonia gas, a method comprising heating boric acid, borates, boron oxides or the like together with metal cyanides, a method comprising heating boron halides, boron hydrides or boron/metal compounds in ammonia gas, and a method comprising heating borides such as $CaB_6$ in the presence of nitrogen are known. These methods, however, have disadvantages in that special starting materials are used, and are merely employed in laboratory.

The above-described two methods (1) and (2) which are industrially employed also have the problem that the degree of conversion is low. The reason thereof is that the melting point of boric acid, borates or the like is low and, therefore, those are liquid within a temperature range at which those are reduction nitrides with ammonia gas or an ammonia/nitrogen gas mixture, resulting in a poor contact between those materials and the gas.

In order to overcome the foregoing problem, several methods have been proposed and employed. One method is a method comprising adding calcium carbonate or calcium phosphate and optionally boron nitride as a carrier to boric acid or borates, reacting at a temperature of 900° C. or more in such a manner that the surface of the carrier is covered with a thin layer of molten boric acid or borates to obtain a crude boron nitride, removing additives with, for example, hydrochloric acid, and then heat treating at 1,800° C. to obtain powdered boron nitride. This method, however, requires a step of removing the additives, which greatly increases production costs. Furthermore, it is difficult to completely remove the additives.

Another method is a method comprising mixing nitrogen-containing compounds such as urea, dicyan diamide or melamine with, for example, borax and the reacting in an inert gas such as nitrogen or a reducing gas such as hydrogen while forming an intermediate which does not melt at a temperature of from 800° to 1,200° C. as described in Japanese Patent Application (OPI) No. 27200/72 (the term "OPI" as used herein means a "published unexamined Japanese patent application"). In this method, the ratio of the nitrogen-containing compound to the boric acid salt, for example, must be controlled to a narrow range and, furthermore, the mixing must be sufficiently and uniformly conducted. If the ratio is outside the specified range or the mixture is not uniform, the degree of conversion is reduced and unreacted compounds are left. As a result, the sponge-like product must be pulverized and washed with water to remove by-products and unreacted compounds and then again subjected to a heat treatment at 1,800° C. in a stream of ammonia.

These methods involve a purification step where boron nitride formed by the high temperature reaction is pulverized to remove the additives and by-products, and a re-combustion step at a high temperature. Therefore, improvement is required from the standpoint of the steps and also the energy consumption. Boron nitride produced by the methods is usually in a flake-like crystal form and such a crystal form is difficult to control. This crystal form of boron nitride imposes limits on improvements in sintering properties of boron nitride, sintering of a mixture of boron nitride and other ceramic materials, utilization of boron nitride as a composite material, and so forth.

SUMMARY OF THE INVENTION

An object of the present invention is to provide a process which can produce boron nitride of high purity in high yield at relatively low temperatures.

Another object of the present invention is to provide a process which can obtain boron nitride in a pillar or needle-like (width: 1 to 15 $\mu$m; length: 5 to 150 $\mu$m) or filament-like (diameter: 0.1 to 0.3 $\mu$m; length: 10 to 50 $\mu$m) crystal form as well as in the conventional flake-like crystal form having a size of 0.3 to 10 $\mu$m.

Still another object of the present invention is to provide boron nitride which is expected to be used as a new material in the field of fine ceramics.

The process for producing boron nitride according to the present invention comprises reacting at least one boron compound selected from the group consisting of boric acid and metal salt of boric acid and at least one nitrogen-containing compound which is capable of bonding to the boron compound to form a compound in which a boron atom and a nitrogen atom coexist, and then heating the resulting compound at a temperature of at least 600° C. in an atmosphere of inert or reducing gas.

DETAILED DESCRIPTION OF THE INVENTION

Figure 1:
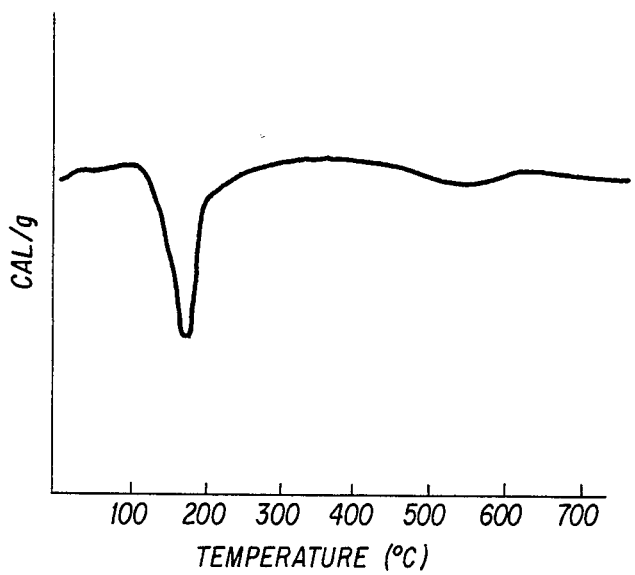
FIGS. 1 and 3 are each a differential thermal analytical curve.

In accordance with the process of the present invention, a boron compound and a nitrogen-containing compound are first reacted to form a compound in which a boron atom and a nitrogen atom coexist.

Boron compounds which can be used are boric acid and borates. Suitable examples of the boron compound include boric anhydride (boron oxide), orthoboric acid, metaboric acid, tetraboric acid, lithium borate, potassium borate, borax and sodium perborate. In addition, alkaline earth metal salts of boric acid can be used.

Nitrogen-containing compounds which can be used are urea, melamine, melam, melem, melon, dicyandiamide, ammelide, guanamines such as acetoguanamine, and nitrogen-containing compound salts such as guanidine hydrochloride, melamine hydrochloride, melamine phosphate or melamine oxalate.

As a medium for use in the reaction between the boron compound and nitrogen-containing compound, almost all solvents including water can be used. For example, as well as water, alcohols such as methyl alcohol, ethyl alcohol, isopropyl alcohol, amyl alcohol, ethylene glycol, propylene glycol, and glycerine; ketones such as acetone, methyl ethyl ketone, acetonitrile acetone, and diisobutyl ketone; esters such as methyl acetate, ethyl acetate, methyl butyrate, ethyl butyrate, methyl propionate, ethyl propionate, methyl formate, ethyl formate, isopropyl formate, and butyl formate; alcohol esters such as butyl lactate, isopropyl lactate, ethyl lactate, and ethyl oxypropionate; amides such as formamide, and dimethylformamide; and aliphatic and aromatic hydrocarbons such as gasoline, petroleum naphtha, mineral spirit, benzene, toluene, and xylene can be used. In addition, ketone esters, ketone alcohols, ether alcohols, and so on can be used. These solvents can be used alone or in combination. In general, when the medium is water, boron nitride in a flake-like crystal form is obtained, and when the medium is a mixture of water and a hydrophilic solvent such as glycerine, isopropanol, ethanol, propylene glycol or tetrahydrofuran, boron nitride in a needle-like, pillar-like or filament-like crystal form is obtained.

The ratio of boron atom to nitrogen atom in the compound obtained from the boron compound and nitrogen-containing compound varies depending on the types of the starting materials. In general, it is desirable for the compound to contain the nitrogen atom in at least a minimum amount necessary to nitride the boron atom. This is essential in a case that the compound is heated in an atmosphere of inert gas not containing nitrogen, such as helium or argon. However, it is possible to use an excess amount of nitrogen compound such as melamine with respect to the boron compound. The reason for this is that such an excess of nitrogen compound is released and removed through decomposition or sublimation, for example, during the preparation of boron nitride by heating.

Reaction conditions between the boron compound and the nitrogen-containing compound are not critical. From an economic standpoint and also from a viewpoint of safety, the reaction is preferably carried out at ordinary temperature under atmospheric pressure. The reaction product is separated from the medium by conventional techniques such as filtration and centrifugal separation and then transferred to the heating step directly or after washing and drying, if necessary.

It is believed that the compound obtained from the boron compound and the nitrogen-containing compound is a complex wherein the boron compound and the nitrogen-containing compound are electronically coordination bonded.

The compound prepared from the boron compound and nitrogen-containing compound is heated at a temperature of at least 600° C., preferably from 600° to 1,600° C. At lower temperatures than 600° C., the reaction for formation of boron nitride does not proceed sufficiently. On the other hand, at higher temperatures than 1,600° C., it is likely that the apparatus is damaged, and furthermore such high temperatures are disadvantageous from an economic standpoint. The heating step is carried out in an atmosphere of inert gas such as argon, helium or nitrogen, or reducing gas such as ammonia or hydrogen, or a mixture thereof. In industrial practice of the process of the present invention, it is advantageous from an economic standpoint and for safety that nitrogen gas, ammonia gas or a mixture thereof is used.

The present invention is based on the unexpected findings that the compound prepared from the boron compound and nitrogen-containing compound can be obtained in various crystal forms depending on the type of the solvent used in the preparation and preparation conditions, and that when the compound is converted into boron nitride by heating, the original crystal form is often maintained after the heating step. Thus, the process of the present invention can produce powdered boron nitride in various crystal forms. The boron nitride is expected to find new applications as a new ceramic or a composite material.

Another feature of the present invention is that boron nitride of very high purity can be produced easily. Even if the boron compound as a starting material contains impurities, it is purified, that is, the impurities are removed during the reaction of the boron compound with the nitrogen-containing compound. If desired, the purity can be more increased by applying techniques such as washing. Heating of such a high purity compound results in the formation of high purity boron nitride. That is, in the process of the present invention, a purification step can be omitted, which is required at the stage of preparation of the starting materials since trace amounts of impurities exert influences on the physical properties of boron nitride which is used as a fine ceramic.

Still another feature of the present invention is that the heating step is carried out at lower temperatures than in conventional methods and the step of removing impurities contained in the boron nitride formed, which is required in the conventional methods, and the step of reheating involved with the step of removing impurities can be omitted. In connection with the above-described purification of starting materials and purification of the boron nitride formed, energy can be greatly saved. This is greatly advantageous from an economic standpoint.

The present invention is described in greater detail by reference to the following Examples and Comparative Examples.

EXAMPLE 1

A 100 ml glass beaker was charged with 80 ml of pure water and further charged with 2.5 g of orthoboric acid and 1.6 g of melamine. The resulting mixture was reacted at room temperature for 1 hour while stirring, and then the reaction mixture was passed through a membrane filter. A cake remaining on the filter was taken out and dried at 105° C. for 3 hours, thereby yielding 3.8 g of crystal powder having a particle size of several microns. Chemical analysis showed that the powder was a salt in which the molar ratio of boric acid to melamine was 2:1. A differential thermal analytical curve of the powder is shown in FIG. 1. As is apparent from FIG. 1, a single peak is shown and it can be confirmed that the salt was formed.

The melamine borate thus prepared was placed in a Petri dish made of nickel and the Petri dish was then placed in an aluminum cylinder. The melamine borate was heated in an electric furnace at 1,000° C. for 2 hours while passing nitrogen gas, and then cooled, thereby yielding finely divided flake-like crystals having a particle size of from 2 to 10 microns. This powder was analyzed by infrared absorption spectroscopy and X-ray diffraction. These analyses confirmed that the powder was boron nitride.

COMPARATIVE EXAMPLE 2

20 grams of orthoboric acid and 20 g of melamine, the molar ratio of orthoboric acid to melamine being 2:1, were fully mixed. The mixture was placed in a Petri dish made of nickel and the Petri dish was then placed in an aluminum cylinder. The melamine borate was heated in an electric furnace at 1,000° C. for 2 hours while passing nitrogen gas and then cooled. Flake-like crystal powder having a particle size of from 5 to 20 microns was obtained. Infrared absorption and X-ray diffraction analyses showed that the powder contained boric anhydride as well as boric nitride.

Figure 3:
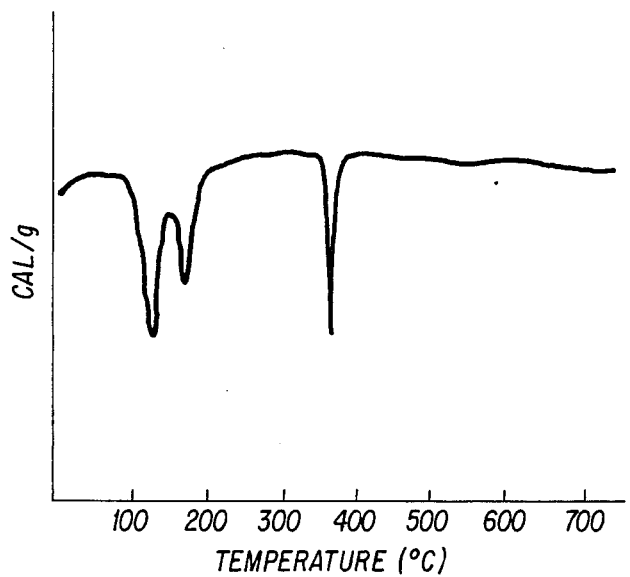
Figure 2:
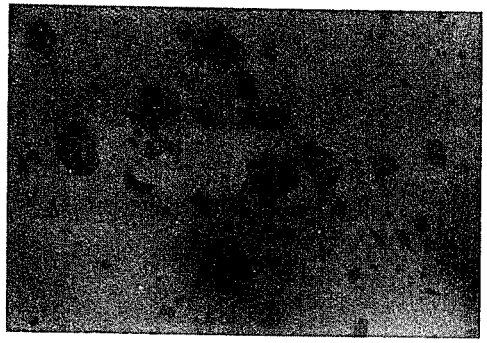
FIGS. 2, 4, 5, 6 and 7 are each a microscopic photograph ($\times 600$) showing the crystal structure of boron nitride.

A differential thermal analytical curve of a mixture of orthoboric acid and melamine is shown in FIG. 3. This is clearly different from the curve of FIG. 1 and shows a pattern of the mixture.

EXAMPLE 2

The procedure of Example 1 was repeated except that as the medium used in preparing the boric acid/melamine adduct, a mixed solvent of 72 ml of isopropyl alcohol and 8 ml of pure water was used in place of 80 ml of pure water.

The boric acid/melamine adduct prepared was a pillar-like crystal form having a width of from 2 to 5 microns and a length of from 10 to 20 microns.

Figure 4:

Boron nitride produced by heating the boric acid/melamine adduct was also a pillar-like crystal form having a width of from 1 to 3 microns and a length of from 5 to 15 microns as shown in FIG. 4.

EXAMPLE 3

The procedure of Example 1 was repated except that as the medium used in preparing the boric acid/melamine adduct, a mixed solvent of 56 ml of methanol and 24 ml of pure water was used in place of 80 ml of pure water.

Boron nitride was a needle-like crystal form having a width of about 0.5 micron and a length of about 10 microns.

EXAMPLE 4

A 100 ml glass beaker was charged with 80 ml of acetone and further charged with 1.2 g of orthoboric acid and 1.2 g of melamine. The resulting mixture was stirred and reacted at room temperature for 3 hours. The reaction product was separated by filtration and heated at 800° C. for 3 hours in the same manner as in Example 1, thereby yielding pillar-like boron nitride having a width of from 2 to 5 microns and a length of from 10 to 20 microns.

At the time when the boric acid/melamine adduct was formed, unreacted melamine remained. This unreacted melamine disappeared during the calcination process. X-ray diffraction analysis showed that the boron nitride formed was pure boron nitride.

EXAMPLE 5

The procedure of Example 1 was repeated except that 80 ml of pure water, 4.5 g of orthoboric acid and 3.2 g of melem were used.

The reaction product was a mixed powder of pillar-like crystals having a width of from 2 to 3 microns and a length of from 5 to 20 microns and about 2 micron crystals which were presumed to be unreacted melem.

On calcining the powder at 1,000° C. for 2 hours in the same manner as in Example 1, pillar-like crystal powder having a width of from 1 to 2 microns and a length of from 3 to 15 microns was obtained. Infrared absorption and X-ray diffraction analyses showed that the powder was pure boron nitride.

EXAMPLE 6

The procedure of Example 5 was repeated except that 1.4 g of orthoboric acid was used and 2.7 g of acetoguanamine was used in place of melem.

Nearly pure boron nitride in a flake-like crystal form having a size of from 2 to 10 microns was obtained.

EXAMPLE 7

The procedure of Example 1 was repeated except that as the atmosphere in the calcination process, ammonia gas was used in place of nitrogen gas.

The boron nitride formed was a flake-like form having a size of from 2 to 10 microns.

EXAMPLE 8

80 ml of pure water was placed in a 100 ml glass beaker, and 13 g of melamine hydrochloride (melamine/HCl=1/1 (by mole)) and 19 g of potassium orthoborate were added thereto. The resulting mixture was reacted at room temperature for 1 hour while stirring with a magnetic stirrer. The reaction mixture was filtered through a membrane filter, and the residue was washed with pure water until $K^+$ and $Cl^-$ were not detected in the filtrate. The cake thus obtained was dried at 105° C. for 3 hours, thereby yielding a flake-like crystal powder having a size of from 0.5 to 5 microns. The powder was placed on a Petri dish made of nickel and then placed on an aluminum cylinder. The powder was heated in an electric furnace maintained at 1,000° C. for 2 hours while passing nitrogen gas therethrough. The flake-like crystal powder having a size of from 0.3 to 3 microns thus obtained was identified as boron nitride by infrared absorption and X-ray diffraction analyses.

EXAMPLE 9

The procedure of Example 1 was repeated except that the heating was conducted at 600° C.

Infrared absorption and X-ray diffraction analyses confirmed that the product was nearly pure boron nitride.

COMPARATIVE EXAMPLE 2

The procedure of Comparative Example 1 was repeated except the heating temperature was changed from 1,000° C. to 600° C.

Infrared absorption and X-ray diffraction analyses showed that the powder obtained contained ammonium borate as well as boron nitride. Upon analysis by the Kjeldahl method, a large amount of nitrogen was detected. It is assumed that unreacted melamine or condensates resulting from deammonization of melamines remained.

EXAMPLE 10

A three-necked flask equipped with a stirrer and a condenser was charged with 280 ml of methanol and 120 ml of water and further charged with 8.4 g of melamine and 12.7 g of boric acid while stirring. The flask was heated on a water bath and maintained at 73° C. for several minutes. Stirring was stopped, the electric source of the water bath was turned off and the flask was gradually cooled over 18 hours to obtain precipitates of very long and narrow (filament-like) crystals.

Figure 5:

The crystals thus obtained were separated by filtration using a filter paper and dried under a reduced pressure. The crystals were then heated at 200° C. for 2 hours in an ammonia atmosphere and further heated at 1,000° C. for 2 hours in the ammonia atmosphere to obtain a while cotton-like product. Microscope observation and X-ray diffraction analysis showed that the product was a filament-like boron nitride (BN) having a diameter of 0.1 to 0.3 μm and a length of 10 to 50 μm as shown in FIG. 5.

EXAMPLE 11

A 200 ml glass beaker was charged with 140 ml of methanol and 60 ml of water and further charged with 8.5 g of melamine. The resulting mixture was mixed by stirring.

On the other hand, another 200 ml glass beaker was charged with 140 ml of methanol, 60 ml of water and 12.6 g of boric acid and the resulting mixture was mixed by stirring.

Two kinds of slurries prepared above were mixed in a 500 ml glass beaker and the resulting mixture was allowed to stand at room temperature for 3 hours to obtain precipitates of pillar-like crystals.

Figure 6:
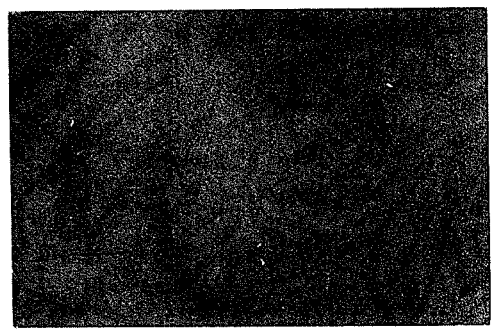

The precipitates thus obtained were separated by filtration using a filter paper, dried under a reduced pressure and heated at 1,000° C. for 2 hours under a nitrogen atmosphere to obtain a white crystal powder. Microscope observation and X-ray diffraction analysis showed that the powder was a pillar-like boron nitride having a diameter of about 1 to 3 μm and a length of about 10 to 70 μm as shown in FIG. 6.

EXAMPLE 12

A 200 ml glass beaker was charged with 140 ml of methanol and 60 ml of water and further charged with 4.8 g of melamine and the resulting mixture was mixed by stirring.

On the other hand, another 200 ml glass beaker was charged with 140 ml of methanol, 60 ml of water and 7.2 g of boric acid, followed by stirring.

Two kinds of the slurries prepared above were mixed in a 500 ml glass beaker. The beaker was placed in a thermostatic chamber maintained at 40° C. and allowed to stand for 7 hours. The beaker was taken out from the chamber and allowed to stand for 24 hours at room temperature to obtain precipitates of narrow and long pillar-like crystals.

The precipitates thus obtained were separated by filtration using a filter paper, dried under a reduced pressure and heated at 1,000° C. for 2 hours under a nitrogen atmosphere to obtain a white crystal powder.

Figure 7:

Microscope observation and X-ray diffraction analysis showed that the powder was a pillar-like boron nitride having a diameter of 3 to 15 μm and a length of 30 to 150 μm as shown in FIG. 7.

While the invention has been described in detail and with reference to specific embodiment thereof, it will be apparent to one skilled in the art that various changes and modifications can be made therein without departing from the spirit and scope thereof.

What is claimed is:

1. A process for producing boron nitride in a needle-like or filament-like crystal form having a diameter of from 0.1 to 15 μm and a length of from 5 to 150 μm which comprises reacting at least one boron compound selected from the group consisting of boric anhydride, boric acid and a metal salt of boric acid and at least one nitrogen-containing compound selected from the group consisting of urea, melamine, melam, melen, melon, dicyandiamide, ammelide, guanamines and salts of said nitrogen containing compounds in the presence of a solvent to form an addition product as a reaction product, the solvent being one which is capable of causing the reaction product to separate in needle-like or filament-like crystal form and being selected from the group consisting of alcohols, ketones, esters, alcohol esters, amides, aliphatic hydrocarbons, aromatic hydrocarbons, ketone esters, ketone alcohols and ether alcohols, separating the resulting compound from the solvent and thereafter heating the resulting compound in said needle-like or filament-like form at a temperature of at least 600° C. in an atomphere of inert or reducing gas.

2. The process as claimed in claim 1, wherein the nitrogen-containing compound is melamine.

3. The process as claimed in claim 1, wherein the solvent is acetone.

4. The process according to claim 2, wherein the solvent is acetone.

5. A process for producing boron nitride in a needle-like or filament-like crystal form having a diameter of from 0.1 to 15 μm and a length of from 5 to 150 μm which comprises reacting at least one boron compound selected from the group consisting of boric anhydride, boric acid and a metal salt of boric acid and at least one nitrogen-containing compound selected from the group consisting of urea, melamine, melam, melem, melon, dicyanodiamide, ammelide, guanamines and salts of the foregoing nitrogen compounds in the presence of solvent medium, separating the resulting compound from the solvent medium to obtain a needle-like or filament-like crystal form of the resulting compound, thereafter heating the resulting compound in said crystal form at a temperature of at least 600° C. in an atmosphere of inert or reducing gas, wherein the solvent medium is a mixture of water and hydrophilic solvent and the hydrophilic solvent is present in amount sufficient to cause formation of said crystal form.

6. The process according to claim 5 where the solvent is a mixture of water and an alcohol.

7. A process for producing boron nitride in a needle-like or filament-like crystal form having a diameter of from 0.1 to 15 μm and a length of from 5 to 150 μm which comprises reacting at least one boron compound selected from the group consisting of boric anhydride, boric acide and a metal salt of boric acid and melem in the presence of water, separating the resulting compound from the water to obtain a needle-like or filament-like crystal form of the resulting compound and thereafter heating the resulting compound in said crystal form at a temperature of a least 600° C. in an atmosphere of inert or reducing gas.

* * * * *